April 27, 1965     B. DAVIES ETAL     3,180,744

REFRACTORY

Filed July 27, 1962     3 Sheets-Sheet 1

INVENTOR.
BEN DAVIES
FRANK H. WALTHER
BY
ATTORNEY

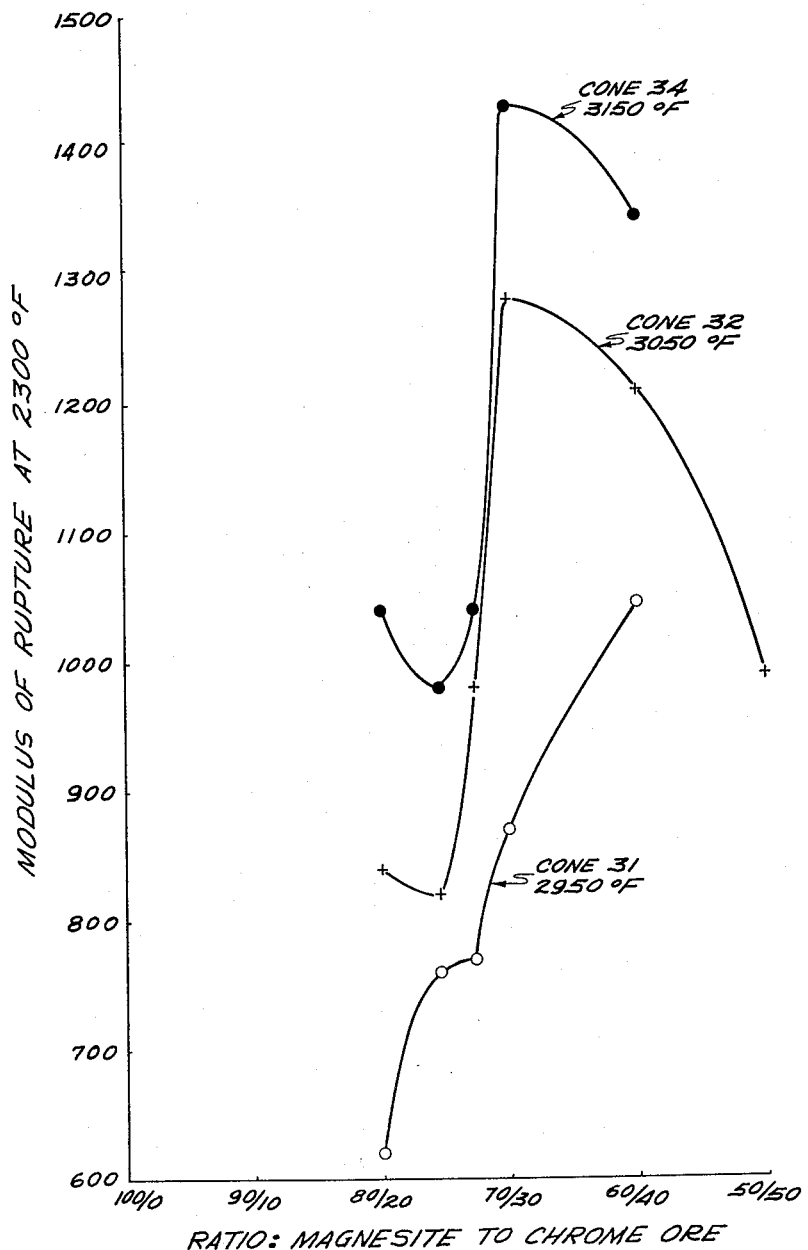

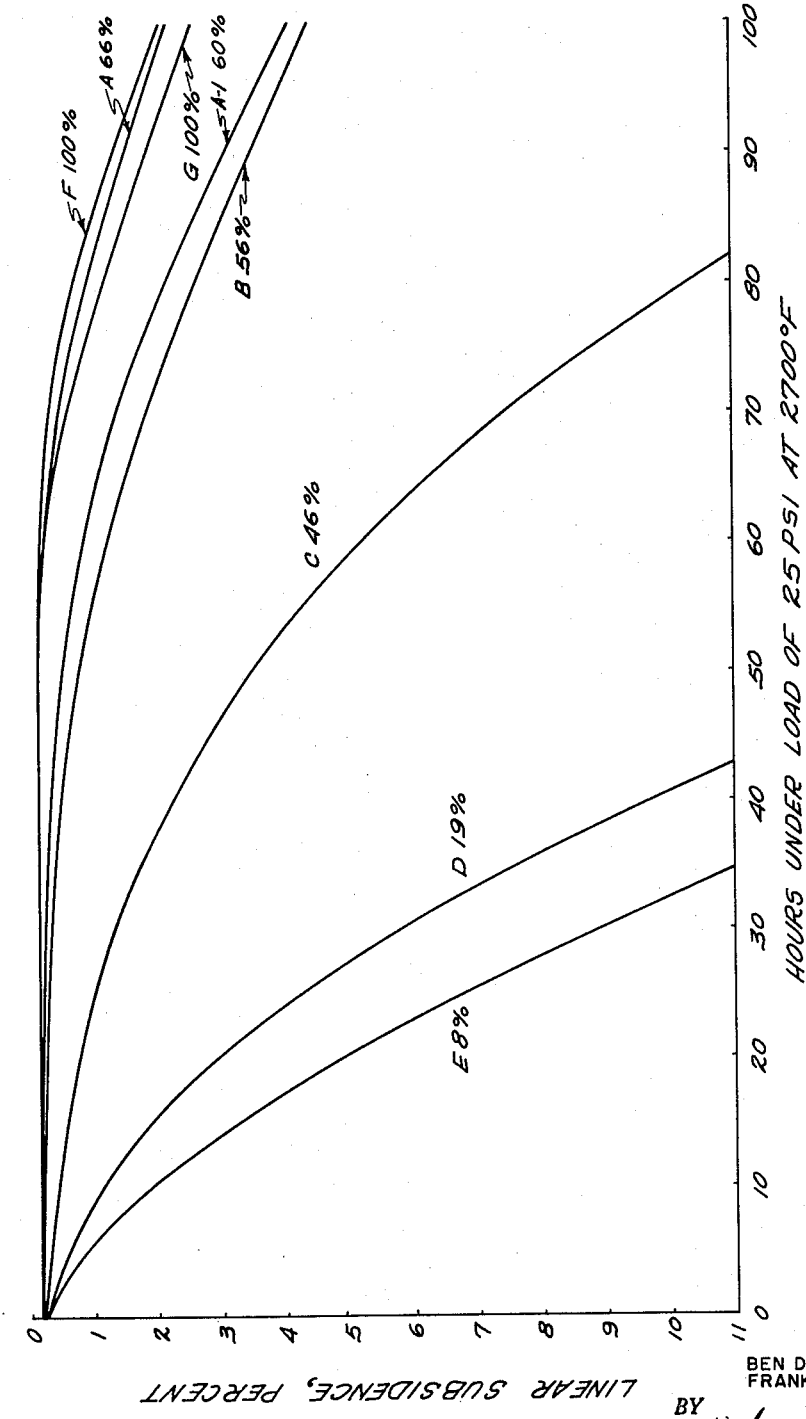

United States Patent Office 3,180,744
Patented Apr. 27, 1965

3,180,744
REFRACTORY
Ben Davies, Pittsburgh, and Frank H. Walther, Bethel Park, Pa., assignors to Harbison-Walker Refractories Company, Pittsburgh, Pa., a corporation of Pennsylvania
Filed July 27, 1962, Ser. No. 212,992
13 Claims. (Cl. 106—59)

This invention relates to refractory structures and to improved refractory shapes usable in the fabrication thereof. Another aspect of this invention relates to improved basic refractory structures, refractory shapes for fabrication thereof, and methods of fabrication of such shapes.

Refractories made of a mixture of dead burned magnesia and chrome ore hold an important place in industry. They are generally divided into those which have a predominance of chrome ore and those which have a predominance of magnesia. This invention is particularly concerned with those having a predominance of magnesia, and refractory structures in which they are used.

Both of the foregoing groups of refractories are referred to in the art as basic refractories. There are various commercial versions of these refractories, which are normally sold as either chemically bonded or unburned refractories, or as burned refractories. This invention relates particularly to the latter.

Despite the technical advance of contemporary workers, burned basic refractories of the magnesia-chrome ore type are characterized by relatively low strength. It is not uncommon for modulus of rupture for these refractories to be less than 600 at room temperature and below 200 at 2300° F. In a furnace structure, in which this type of refractory is included, it is not uncommon for the brick to be subjected to stresses from many different sources.

In a furnace structure, in which this type of refractory is included, the hot face thereof is not uncommonly subjected to temperatures exceeding 2000° F., while the cold face thereof is at a considerably colder temperature. This temperature gradient causes internal stresses to be set up in the refractories, which stresses usually result in peeling away of large sections of a furnace roof or wall. This phenomenon of peeling due to thermal gradient may be referred to as thermal shock loss. Such thermal shock loss, due to the progressive weakening of the refractory shapes, becomes aggravated with continued furnace operation.

Other stress causing factors, equally, if not more, detrimental to this type of refractory, include phase changes, recrystallization, and differential expansion of the mineral components.

Accordingly, it is an object of this invention to provide improved furnace structures fabricated of magnesia-chrome ore refractory shapes, having high strength at elevated temperatures. It is another object of this invention to provide improved magnesia-chrome ore refractory shapes and methods for fabrication thereof. It is another object of this invention to provide improved magnesia-chrome ore refractories, which have good strength and operate satisfactorily under repeated and wide changes in operating temperature. It is yet another object of this invention to provide improved magnesia-chrome ore refractories, which exhibit excellent strength under high operating temperature, resist spalling because, in part, of improved thermal shock resistance, and which resist loss of strength under cyclic variations of temperature as are encountered in the repeated heating and cooling of a metallurgical furnace. It is another object of this invention to provide methods of economically fabricating good quality magnesia-chrome ore refractories. It is a further specific object of this invention to provide improved furnace structures of the basic open hearth type having excellent hot strength, resistance to peeling and spalling because, in part, of improved thermal shock resistance; and which resist loss of strength under cyclic variations in temperature, as are encountered in repeated heating and cooling of an open hearth furnace.

Briefly, according to one aspect of this invention, there is taught a method of utilizing low silica chrome ores and high purity magnesia to obtain refractory shapes having good strength and stability at 2300° F. In an exemplary embodiment, the invention provides for fabricating a refractory batch of about 70 parts, by weight, of high purity magnesia and about 30 parts, by weight, of low silica chrome ore in a very particular brickmaking graded size range. Shapes are made from the batch and fired under carefully controlled conditions above about 3050° F. The resulting shapes at ambient or room temperatures are relatively weak, as compared to their strength at 2300° F. However, the shapes have sufficient physical stability as to allow ready handling and shipping. The hot strength of these shapes exceeds twice the modulus of rupture at room temperature. The shapes will not fail in the ASTM load test at 3300° F., and give superior results in sustained load tests at 2700° F.

A better understanding, other features, and further objects and advantages of the invention will become readily apparent to those skilled in the metallurgical and refractory arts, from a study of the following description with reference to the drawings. In these drawings:

FIGURE 2 is a comparative plot of the ratio of magnesia to chrome ore vs. modulus of rupture at elevated temperatures for comparative manufacturing burns of refractories, according to the invention;

FIGURE 3 is a comparative plot of percentage linear subsidence vs. time illustrating the superior character of refractories, according to the invention.

Figure 1:
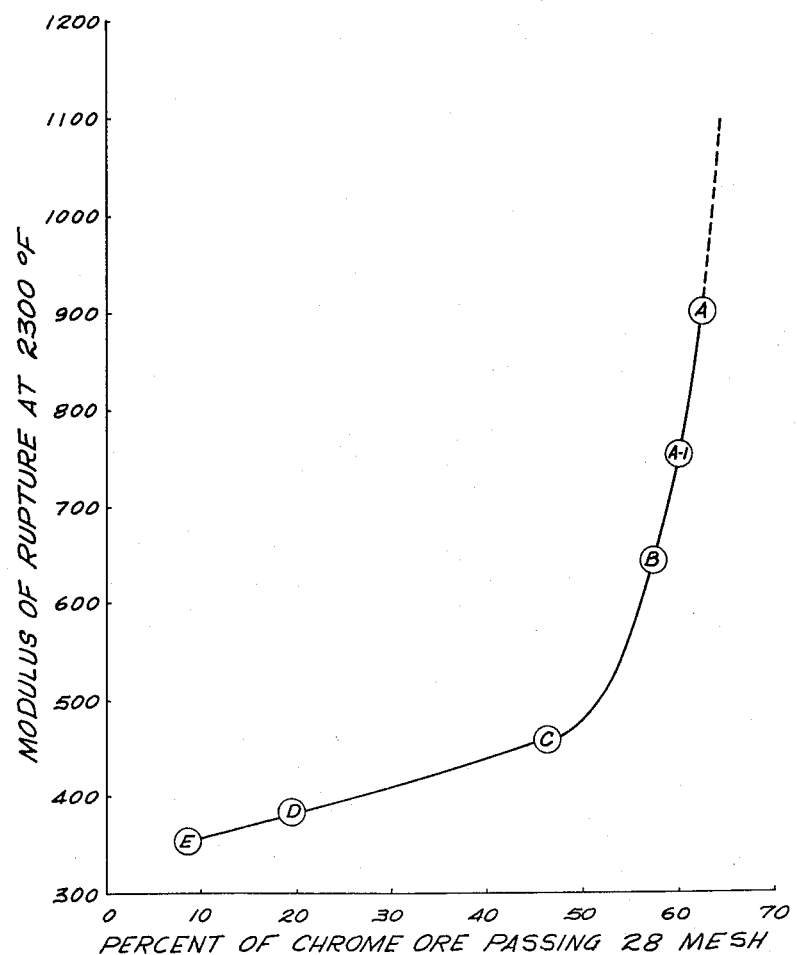
FIGURE 1 is a comparative plot illustrating the importance of chrome ore sizing for refractories, according to the invention.

Prior workers have approached the problem of obtaining exceptable strength and thermal shock resistance for magnesia-chrome ore refractories, by attempting to build a refractory shape which is strong at room temperature, i.e., which has a good modulus of rupture at room temperature. The approach of such prior workers is based primarily on the thought that brick gradually lose their strength as the temperature is increased and, for any particular system, the brick with the highest strength at room temperature will most likely have the highest strength at some elevated temperature. While this is often true, increasing the strength at room temperature is normally only attained by sacrificing thermal shock resistance.

We have built a refractory shape with emphasis on its high temperature strength, rather than its strength at room temperature. This has resulted in a refractory having both unusual strength at elevated temperatures and good shock resistance. Although the phenomenon is not entirely understood, refractory shapes, according to our invention, when studied under the microscope at room temperature, exhibit a peculiar combination of bonding and tessellated cracking between the chrome ore and magnesite. In some manner, this tessellated cracking appears to overcome or compensate for internal stresses, which occur in shapes at operating temperatures; while the bonding forms a rigid skeletal network in the refractory, that provides good strength at elevated temperatures. In some manner, this peculiar combination of tessellated cracking and bonding results in shapes having a strength at 2300° F., which always exceeds twice that at room temperature.

In laboratory testing, we discovered that the optimum blend, by weight, for magnesia and chrome ore, according to our invention, should be about 70 magnesia/30 chrome ore. A 70/30 magnesia-chrome ore blend is not new to my invention. However, as will be developed below, in combination with other parameters, this 70/30 blend is advisable for best results. It is also advisable, for our invention, that the silica content of the blend should be less than about 2% $SiO_2$, on the basis of an oxide analysis, and based on the weight of the total mixture. However, equally important parameters are the temperature of burning, and the percentage of chrome ore passing a 28 mesh screen (Tyler Series).

Table I below sets forth the details of a group of test mixes and shapes manufactured therefrom. In this table, the analysis of the chrome ore and magnesia used is as follows (all parts by weight, and on the basis of an oxide analysis):

| Chemical analysis | Transvaal chrome ore, percent | Dead burned magnesia, percent |
|---|---|---|
| $SiO_2$ | 1.9 | 0.7 |
| $Al_2O_3$ | 15.6 | 0.5 |
| $Fe_2O_3$ | 24.3 | |
| $Cr_2O_3$ | 46.0 | |
| CaO | 0.2 | 0.8 |
| MgO | 11.3 | 98.0 |
| Ignition loss | 0.7 | |

The tests reported in Table I illustrated the importance of fine chrome ore in order to obtain good high temperature strength. The series of Mixes A through E were the first ones made to determine the effect of chrome ore grain sizing on the physical properties of shapes made therefrom.

As will be seen from FIG. 1 (which is a plot of chrome ore sizing vs. hot strength for mixes A–E), it appeared that when over 50% of the chrome ore passed 28 mesh there was a sharp rise in modulus of rupture at 2300° F. Therefore, additional tests were undertaken, which are represented by Mixes F, G and H of Table I. It appeared from these additional tests, that it was essential for the major portion of the chrome ore passing 28 mesh to be held on 65 mesh. This is readily ascertained from a comparison of the modulus of rupture at 2300° F. of Mixes F, G and H. In Mix G, where a major portion of the chrome ore was less than 65 mesh, a definite drop in modulus of rupture was noted, i.e., 990 vs. 1490 for Mix F, wherein a major portion of the chrome ore was 28 on 65. Mix H, in which all of the chrome ore was 28 on 65, gave better results than Mix G, but not as good as Mix F. Mixes D and E, having a considerable amount of coarse chrome ore were the least satisfactory of all mixes tested. It appears that, since chrome ore has considerably lower thermal expansion than magnesia, that when the brick of such mixes is cooling, after burning, the differential contraction between the chrome grain and the magnesia sets up localized internal stress in the brick. Microscopic examination of the brick of Mixes D and E suggested that when these chrome grains greatly exceed about 28 mesh, the stress was sufficient to detach the chrome grain from its environment, leaving these grains surrounded by a microscopic void.

FIG. 3 is a schematic plot of the subsidence test results of Mixes A through G of Table I, further showing the importance of chrome ore sizing. (Mix H was not tested and, thus, is not plotted in FIG. 3.)

All of the mixes of Table I were burned at cone 32½ or 3050° F. To determine the relative effects of burning temperature, additional test work was undertaken in which identical mixes were subjected to 2950, 3050 and 3150° F. burns. In these additional tests, the relative blend of magnesia to chrome ore was varied between 80 magnesia/20 chrome ore and 60 magnesia/40 chrome ore, to determine what effect this would have on the modulus of rupture at 2300° F. Table II below sets forth the results of these tests. Note that in each of these tests 66% of the chrome ore passed 28 mesh, and the major portion thereof was held on a 65 mesh screen. The chrome ore and magnesia used in Table II tests were the same as those used in the test reported in Table I, below.

*Table 1*

Mix—All mixes, percent:
   Chrome ore II, 30.
   Magnesia I, 70.

| Mix number | A | A-1 | B | C | D | E | F | G | H |
|---|---|---|---|---|---|---|---|---|---|
| Chrome ore particle size (Tyler mesh size) | −6 / 32½ | −6+150 / 32½ | −6+65 / 32½ | −6+48 / 32½ | −6+35 / 32½ | −6+28 / 32½ | −28 / 32½ | −48 / 32½ | −28+65 / 32½ |
| Burn, cone: Temperature (3,050° F.), linear change in burning, percent | +0.8 | +0.8 | +0.8 | +0.8 | +0.8 | +0.9 | +0.9 | +1.6 | +0.8 |
| Weight, pcf | 193 | 191 | 192 | 191 | 191 | 190 | 193 | 185 | 193 |
| Modulus of rupture, p.s.i.: | | | | | | | | | |
| At room temperature of about 70° F. | 430 | 340 | 290 | 240 | 200 | 210 | 500 | 290 | 480 |
| At 2,300° F. (5 hour hold) | 900 | 750 | 640 | 460 | 380 | 350 | 1,490 | 990 | 1,170 |
| Apparent porosity, percent | 17.3 | 18.8 | 18.3 | 18.4 | 19.1 | 19.1 | 18.2 | 20.9 | 17.8 |
| Roll scale slag test at 2,950° F.: Width change of brick, percent | +0.4 | +0.4 | +0.9 | +1.1 | +0.4 | +0.2 | +0.4 | +1.1 | +0.2 |
| Load test, 25 p.s.i.: Temperature of failure or percent subsidence | (1) | (2) | (3) | (4) | (5) | (6) | (7) | (8) | (8) |
| Sustained load test at 2,700° F. (25 p.s.i.): | | | | | | | | | |
| Subsidence after 100 hours, percent | 2.2 | 4.1 | 4.4 | | | | 2.1 | 2.6 | (9) |
| Time to failure, hrs | | | | 82½ | 42½ | 34 | | | |
| Screen analysis of mix, percent: | | | | | | | | | |
| 6 on 10 mesh | 19 | 19 | 24 | 22 | 21 | 21 | 20 | 21 | 23 |
| 10 on 28 mesh | 24 | 21 | 18 | 21 | 24 | 30 | 17 | 26 | 10 |
| 28 on 65 mesh | 18 | 19 | 19 | 19 | 18 | 11 | 22 | 11 | 28 |
| −65 mesh | 39 | 41 | 39 | 38 | 37 | 38 | 41 | 42 | 39 |
| Screen analysis of chrome ore, percent: | | | | | | | | | |
| 8 on 10 mesh | 5 | 4 | 5 | 6 | 11 | 12 | | | |
| 10 on 28 mesh | 29 | 36 | 39 | 48 | 70 | 86 | | | |
| 28 on 65 mesh | 41 | 46 | 56 | 46 | 19 | 8 | 66 | 24 | 100 |
| −65 mesh | 25 | 14 | | | | | 34 | 76 | |

[1] 2.2% at 3,300° F.
[2] 3.1% at 3,300° F.
[3] Failed at 3,300° F.
[4] Failed at 3,165° F.
[5] Failed at 3,095° F.
[6] Failed at 2,995° F.
[7] 1.4% at 3,300° F.
[8] 1.5% at 3,300° F.
[9] No test.

Table II

| Mix, percent: | | | | | | | | | | | | | | |
|---|---|---|---|---|---|---|---|---|---|---|---|---|---|---|
| Chrome ore [1] | 20 | | | 25 | | | 27.5 | | | 30 | | | 40 | |
| Magnesia: | | | | | | | | | | | | | | |
| −4+10 mesh | 35⎫ | | | 35⎫ | | | 35.0⎫ | | | 35⎫ | | | 34⎫ | |
| −10+28 mesh | 16⎬80 | | | 12⎬75 | | | 9.0⎬72.5 | | | 8⎬70 | | | 2⎬60 | |
| Ball mill fines | 29⎭ | | | 28⎭ | | | 28.0⎭ | | | 27⎭ | | | 24⎭ | |
| Mix number | A | Ax | Ay | B | Bx | By | C | Cx | Cy | D | Dx | Dy | E | Ex | Ey |
| Temperature, °F. (10 hour hold) | 2,950 | 3,050 | 3,150 | 2,950 | 3,050 | 3,150 | 2,950 | 3,050 | 3,150 | 2,950 | 3,050 | 3,150 | 2,950 | 3,050 | 3,150 |
| Modulus of rupture, p.s.i.: | | | | | | | | | | | | | | | |
| At 70° F | 340 | 360 | 420 | 320 | 330 | 400 | 380 | 370 | 430 | 360 | 490 | 480 | 470 | 410 | 520 |
| At 2,300° F | 620 | 840 | 1,040 | 760 | 820 | 980 | 770 | 980 | 1,040 | 870 | 1,280 | 1,430 | 1,040 | 1,210 | 1,340 |
| Load test, 25 p.s.i.: Linear subsidence at 3,300° F, percent | 3.1 | 1.8 | 1.7 | 2.6 | 1.7 | 1.8 | 2.2 | 1.8 | 1.4 | 2.7 | 2.2 | 2.0 | 2.3 | 1.3 | 1.0 |
| Screen analysis of mix, percent: | | | | | | | | | | | | | | | |
| 6 on 10 mesh | | 24 | | | 22 | | | 19 | | | 19 | | | 21 | |
| 10 on 28 mesh | | 24 | | | 23 | | | 26 | | | 24 | | | 22 | |
| 28 on 65 mesh | | 14 | | | 16 | | | 17 | | | 18 | | | 20 | |
| Pass 65 mesh | | 38 | | | 39 | | | 38 | | | 39 | | | 37 | |

[1] Chrome ore screen analysis, percent:
  6 on 10 mesh, 5.
  10 on 28 mesh, 29.
  28 on 65 mesh, 41.
  Pass 65 mesh, 25.

Results of the tests set forth in Table II are plotted in FIG. 2, and clearly demonstrate that optimum modulus of rupture at 2300° F. for the 70/30 magnesia-chrome ore blend is obtained by burning above about 3000° F., and preferably at 3150° F. Even though this invention is preferably directed to magnesia-chrome ore refractories having a modulus of rupture at 2300° F. above about 1000 p.s.i., it should be noted that all of the mixes of Table II, having the benefit of our chrome ore sizing, gave considerably better results than such as Mixes C, D and E of Table I, which do not have the benefit of this chrome ore sizing.

As mentioned above, our testing also indicated that the silica content of the mix was very important. In additional testing, mixes were made up of 70 parts magnesia and 30 parts chrome ore. The magnesia was the same as that described above; but the chrome ore selected had 5.5 parts, by weight, of $SiO_2$, on the basis of an oxide analysis. The detailed analysis of this chrome ore, on the basis of an oxide analysis, is as follows:

| | Percent |
|---|---|
| $SiO_2$ | 5.5 |
| $Al_2O_3$ | 29.2 |
| $Fe_2O_3$ | 12.6 |
| $Cr_2O_3$ | 32.1 |
| CaO | 0.6 |
| MgO | 18.8 |
| Ignition loss | 1.0 |

In these tests, the chrome ore had the benefit of our preferred size grading. The modulus of rupture at 2300° F., in the case of all of these additional test mixes, was satisfactory, but all of the test pieces made from these mixes failed below 3300° F. in the load test.

Thus, according to a preferred embodiment of this invention, the magnesia to chrome or weight ratio is 70/30, but is satisfactory between 80/20 and 60/40 (see FIG. 2). The burning temperature is preferably above 3000° F., but optimum results are obtained between 3050 and 3150° F. (see FIG. 2). At least the major portion of the chrome ore must substantially all pass 28 mesh and, preferably, the major portion thereof, which passes a 28 mesh screen, must rest on a 65 mesh screen. The hot modulus of rupture of the refractories is preferably at least twice the cold modulus of rupture and, in a preferred embodiment, the hot modulus is above about 1000 p.s.i. In a preferred embodiment, the linear subsidence in a load test, under 25 p.s.i. and at 2700° F. for 100 hours, is less than about 5%, and is preferably less than about 3%.

Furthermore, as is apparent from the Table I and Table II data, the −65 mesh fraction of the total mix should contain more magnesia than chrome ore. If this is not true, the density of the brick is reduced and there is not sufficient magnesia in the fines as to react with the chrome ore (compare Mixes F, G and H).

Having thus described the invention in detail and with sufficient particularity, as to enable those skilled in the art to practice it, what we desire to have protected by Letters Patent, is set forth in the following claims.

We claim:

1. A burned refractory shape consisting of refractory brickmaking size graded magnesia and chrome ore in a weight ratio between about 80/20 and 60/40, at least a major portion of the chrome ore passing a 28 mesh screen and resting on a 65 mesh screen, there being more −65 mesh magnesia than −65 mesh chrome ore, said shape being burned above about 3000° F. and having a modulus of rupture at 2300° F. at least substantially twice that at room temperature.

2. The method of making a burned basic refractory shape, which comprises the steps of forming a refractory brickmaking size graded mixture consisting of magnesia and chrome ore in a weight ratio between about 80/20 and 60/40, at least the major portion of the chrome ore passing a 28 mesh screen and resting on a 65 mesh screen, adding sufficient tempering fluid as to allow forming, forming the mixtures into shapes, burning said shapes above about 3000° F. to obtain shapes having a modulus of rupture at 2300° F. at least substantially twice that at room temperature.

3. A burned refractory shape consisting of refractory brickmaking size graded magnesia and chrome ore in a weight ratio between about 80/20 and 60/40, at least a major portion of the chrome ore passing a 28 mesh screen and resting on a 65 mesh screen, there being more −65 mesh magnesia than −65 mesh chrome ore, there being no more than about 2% $SiO_2$, by weight on the basis of an oxide analysis, in the shape, said shape being burned above about 3000° F. and having a modulus of rupture at 2300° F. at least substantially twice that at room temperature.

4. The method of making a burned basic refractory shape, which comprises the steps of forming a refractory brickmaking size graded mixture consisting of magnesia and chrome ore in a weight ratio between about 80/20 and 60/40, at least the major portion of the chrome ore passing a 28 mesh screen and resting on a 65 mesh screen, there being no more than about 2% $SiO_2$, by weight on the basis of an oxide analysis, in the mixture, adding sufficient tempering fluid as to allow forming, forming the mixture into shapes, burning said shapes above about 3000° F. to obtain shapes having a modulus of rupture at 2300° F. at least substantially twice that at room temperature.

5. A burned basic refractory shape consisting of refractory brickmaking size graded magnesia and chrome ore in a weight ratio between about 80/20 and 60/40, substantially all of the chrome ore being −28+65 mesh, said shape being burned at a temperature above about 3000° F. to obtain a burned shape having a modulus of rupture at 2300° F. which is at least about twice that at room temperature.

6. A burned basic refractory shape consisting of refractory brickmaking size graded magnesia and chrome ore in a weight ratio between about 80/20 and 60/40, substantially all of the chrome ore being −28+65 mesh, said shape being burned at a temperature above about 3000° F. to obtain a burned shape having a modulus of rupture at 2300° F. which is at least about twice that at room temperature, there being no more than about 2% $SiO_2$, by weight on the basis of an oxide analysis, in the shape.

7. The method of claim 2 in which substantially all of the chrome ore passes a 28 mesh screen and rests on a 65 mesh screen.

8. The burned refractory shape of claim 1, in which the magnesia to chrome ore weight ratio is about 70/30.

9. The burned refractory shape of claim 1, in which the burning temperature is between about 3050 and 3150° F.

10. The burned refractory shape of claim 1, in which the modulus of rupture at 2300° F. is in excess of about 1000 p.s.i.

11. The method of claim 2, in which the shapes are burned between about 3050 and 3150° F.

12. The method of claim 2 in which the mixture includes a −65 mesh fraction and there being more magnesia than chrome ore in said −65 mesh fraction.

13. The method of claim 2, in which the magnesia to chrome ore weight ratio in the mixture is about 70/30.

References Cited by the Examiner
UNITED STATES PATENTS 2,079,066   5/37   Hartmann _____ 106—59
2,639,993   5/53   Heuer _____ 106—59

TOBIAS E. LEVOW, *Primary Examiner.*